United States Patent Office 3,499,906
Patented Mar. 10, 1970

---

3,499,906
5,9-DIETHYL-2'-HYDROXY-2-SUBSTITUTED-6,7-BENZOMORPHANS
Franklin M. Robinson, Ambler, Paul S. Anderson, North Wales, and James A. Nicholson, Philadelphia, Pa., assignors to Merck & Co., Inc., Rahway, N.J., a corporation of New Jersey
No Drawing. Filed May 20, 1966, Ser. No. 551,534
Int. Cl. C07d 39/00
U.S. Cl. 260—293.4      6 Claims

---

ABSTRACT OF THE DISCLOSURE

This invention concerns novel 5,9-diethyl-2'-hydroxy-2-substituted-6,7-benzomorphan derivatives and the isomers thereof and processes for the preparation of the same. The novel 5,9-diethyl-2'-hydroxy-2-substituted-6,7-benzomorphan derivatives have analgesic and pain-relieving activity as well as being non-addicting and non-narcotic.

---

This invention relates to novel benzomorphan derivatives which have pronounced analgesic activity. More specically this invention relates to 5,9-diethyl-2'-hydroxy-2-substituted-6,7-benzomorphan derivatives and processes for the preparation of the same.

The 5,9-diethyl-2'-hydroxy-2 - substituted-6,7-benzomorphan derivatives of this invention have pronounced analgesic or pain relieving activity coupled with the highly desirous property of being non-addicting and non-narcotic.

The 5,9-diethyl benzomorphans of this invention show little activity in the standard rat tail flick or rat tail pinch test, thus indicating either no addicting properties or a low order of addiction liability, since there is a direct correlation between increased addiction liability and increased activity in the above-identified tests. On the other hand, the benzomorphan derivatives of this invention show good activity in a modified Randall Selitto test. Good activity in this test would indicate useful analgesic activity since cyclazocine and pentazocine, two known analgesics, show activity in this test and additionally are knwon to have low addiction liability.

The benzomorphan derivatives of this invention generally have minimal side effects and minimal toxicity and many of them have little or no narcotic antagonist activity. The lack of narcotic antagonist activity can be advantageous because of the observation that high antagonist activity has generally been associated with undesirable side effects.

A further feature of this inventon resides in the fact that the compounds of this invention can be produced by synthetic means more conveniently than are members of the morphine family of naturally occurring alkaloidal analgesics.

The compounds of this invention are administered orally or subcutaneously, preferably as an aqueous solution of the hydrochloride salt and in the range of about .001 mg./kg. to about 18 mg./kg. The compounds also have a favorable therapeutic ratio.

It is an object of this invention to provide novel 5,9-diethyl-2'-hydroxy-2 - substituted-6,7 - benzomorphan derivatives having analgesic properties and being substantially devoid of addicting properties as well as processes for their preparation.

The compounds of this invention can be represented by the following structural formula:

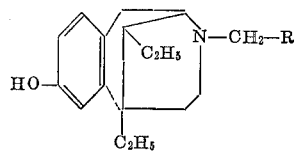

Structure I wherein R represents a 3 to 6 membered saturated ring having one hetero atom selected from the hetero atoms of oxygen nitrogen and sulfur in the ring, which saturated heterocyclic ring can be substituted with one or more lower alkyl substituents such as methyl, ethyl, cyclopropyl and the like. Examples of N-substituents which result in the preferred benzomorphan derivatives would be 3-thietylmethyl, 2-epoxypropyl, N-methyl-3-azetidinylmethyl, 3-(N,4-dimethylpyrrolidinyl)methyl, 3-tetrahydrofurylmethyl, 3-(4-ethyltetrahydrothienyl)methyl and 4-(N-cyclopropyl-2,6-dimethylpiperidinyl)methyl radicals.

Included in this invention are the isomers of the above-noted structures in which the two ethyl groups are in cis relationship to each other which are also referred to in this application as the normal or α isomers.

The cis isomer discussed above can be separated into its optical isomers [dextro (+) and levo (−)] by preparing the diasteroisomeric salts with optically active acids either d (+) or l (−) which salts then can be separated by fractional crystallization.

Prior to our invention, it had generally been known that levorotatory (−) isomers of benzomorphan compounds possesed substantially all the desired analgesic activity exhibited by the mixture of isomers whereas the dextro (+) isomer possed little or no analgesic activity. We surprisingly found, however, that the dextro (+) isomers of many of the novel 5,9-diethyl-2'-hydroxy-2-substituted-6,7-benzomorphans of our invention posses analgesic and other desirable properties discussed above contrary to what is generally known concerning inactivity of these isomers. Thus, it is to be understood that included in this invention along with the novel 5,9-diethyl-2'-hydroxy-2-substituted - 6,7-benzomorphan derivatives are the individual optical isomers, that the dextrorotatory (+) as well as the levorotatory (−) isomers of our novel benzomorphan compounds.

The 5,9-diethyl-2-hydroxy-2 - substituted - 6,7-benzomorphans of this invention can be used as such or in the form of their non-toxic, pharmaceutically acceptable acid addition salts. Such salts are prepared from suitable acids such as inorganic acids as hydrochloric or sulfuric acid, or organic acids, as acetic or maleic acid and the like. The acid addition salts are prepared by reacting the base with approximately one equivalent of the selected acid in an organic solvent such as diethyl ether or alcohol.

The 5,9-diethyl-2'-hydroxy-2-substituted-6,7-benzomorphans of this invention can be prepared by one or more of the following processes. One method especially suitable for the preparation of compounds of Structure I where R is a heterocyclic ring containing an oxygen atom therein involves an N-substitution which comprises heating 5,9-diethyl-2'-hydroxy-6,7-benzomorphan with a reactive halide, tosylate or sulfonate of the formula $RCH_2X$ (wherein X is halo, tosyl or other reactive sulfonyl containing groups) and R is as defined above for Structure I, in a water miscible solvent such as dimethylformamide or an alkanol such as ethanol at a temperature of between about 70° C. to 120° C. in the presence of an alkali metal carbonates such as sodium or potassium bicarbonate.

A second and especially suitable method for the preparation of the 5,9-diethyl-2'-hydroxy-2-substituted-6,7-benzomorphans of the present invention wherein the 2-substituent is CH₂R involves reacting 5,9-diethyl-2'-hydroxy-6,7-benzomorphan with two equivalents of a mixed anhydride of the formula

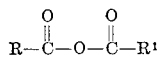

(wherein R is as defined below and R¹ is lower alkyl) to form the 2-acyl-2'-acyloxy-derivative

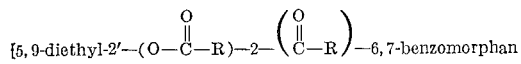

followed again by reduction with lithium aluminum hydride in an appropriate solvent such as ethyl ether or tetrahydrofuran to form the desired compounds. The mixed anhydride in the latter reaction is usually prepared in situ by the reaction on an appropriate tertiary amine (such as triethylamine) salt of an acid of the formula

(wherein R is as defined above for Structure I especially, however, wherein R is a heterocyclic ring containing sulfur or oxygen atoms therein) with a lower alkyl chloroformate, preferably ethyl chloroformate or isobutyl chloroformate, in an inert solvent such as chloroform.

The reaction above between the benzomorphan and the mixed anhydride must sometimes be carried out at low temperatures preferably between −30° C. to 0° C.

In all the above processes, the desired end products are isolated from their particular reaction solutions or mixtures by methods known in the art.

The starting materials for the preparation of the novel compounds of this invention, namely, 5,9-diethyl-2'-hydroxy-6,7-benzomorphan is prepared from 5,9-diethyl-2'-hydroxy-2-methyl-6,7-benzomorphan which is a known compound. The preparation of the starting material is preferably performed by acylating 5,9-diethyl-2'-hydroxy-2-methyl-6,7-benzomorphan at the 2'-position with acetic anhydride, heating the acylated compound at elevated temperature with cyanogen bromide in an organic solvent, preferably a halogenated hydrocarbon, for example, chloroform, thereby replacing the 2-methyl group with a cyano group and then removing the cyano and acetyl groups by hydrolysis in a dilute acid solution. A detailed preparation of the starting material is shown in Example 1.

In addition to using the racemic form of the starting material, there may be employed one of its isomeric forms prepared by known methods using a resolving agent such as camphor sulfonic acid, tartaric acid, dibenzoyl tartaric acid and the like to form the (−) levo and (+) dextro isomers. Each optical isomer of 5,9-diethyl-2'-hydroxy-6,7-benzomorphan can then be used as the starting material in the various examples resulting in (+) dextro or (−) levo 5,9-diethyl-2'-hydroxy-2-substituted-6,7-benzomorphans. Alternatively, the racemic 5,9-diethyl - 2' - hydroxy - 2 - substituted - 6,7 - benzomorphan end products can themselves be resolved according to a procedure similar to that described above, to yield the dextrorotatory (+) and levorotatory (−) isomers of 5,9 - diethyl - 2' - hydroxy - 2 -substituted - 6,7 - benzomorphans.

The following examples illustrate the various methods described above for the preparation of the novel 5,9-diethyl - 2' - hydroxy - 2 - substituted - 6,7 - benzomorphans of the present invention.

In all of the examples, the cis (normal or α) form of the 5,9-diethyl-2'-hydroxy-6,7-benzomorphan is used as the starting material thus yielding the corresponding cis-end product. However, in some instances the dextrorotatory (+) or the levorotatory (−) isomer of cis 5,9-diethyl-2'-hydroxy-6,7-benzomorphan can also be used as the starting material thus yielding the corresponding dextrorotatory (+) or levorotatory (−) end product. The examples should be construed as illustrations of the invention and not as limitations thereof.

EXAMPLE 1

Preparation of 5,9-diethyl-2'-hydroxy-6,7-benzomorphan from 5,9-diethyl-2'-hydroxy-2-methyl-6,7-benzomorphan Five grams (.019 m.) of 5,9-diethyl-2'-hydroxy-2-methyl-6,7-benzomorphan and 8.7 ml. of acetic anhydride are combined and heated on a steam bath for 35 minutes. The clear solution is cooled and poured into 15 ml. of ice water. This mixture is made alkaline to (pH 10–12) with 40% NaOH. The basic mixture is then extracted with chloroform and the chloroform washed with water and dried over sodium sulfate. The chloroform is then evaporated to dryness and the residue is dissolved in 37 ml. of dry chloroform. This solution is added over ½ hour to a stirred solution of 6.37 g. (.06 ml.) of cyanogen bromide dissolved in 37 ml. of chloroform. The reaction mixture is then refluxed for three hours and evaporated to dryness under reduced pressure. The resulting 5,9-diethyl - 2' - acetoxy - 2 - cyano - 6,7 - benzomorphan is treated with 70 ml. of 6% HCl and refluxed for 8 hours. The reaction mixture is cooled, made alkaline to pH 10 with ammonium hydroxide, washed with chloroform and dried over sodium sulfate. The mixture is then concentrated to dryness as above to yield crude 5,9-diethyl-2'-hydroxy-6,7-benzomorphan. After recrystallization from ethanol, the 5,9-diethyl-2'-hydroxy-6,7-benzomorphan has a melting point of 265–268° C.

*Analysis.*—Calculated for $C_{16}H_{23}NO$ (percent): C, 78.32; H, 9.45; N, 5.71. Found (percent): C, 78.01; H, 9.28; N, 5.42.

EXAMPLE 2

5,9-diethyl-2'-hydroxy-2-(3-thietylmethyl)-6,7-benzomorphan

To a stirred ice-cooled solution of 0.71 grams of thietyl-3-carboxylic acid in 25 ml. of chloroform is added 0.62 gram of triethylamine followed by 0.82 gram of isobutylchloroformate. After stirring at 0° C. for 15 minutes 0.5 gram of 5,9-diethyl-2'-hydroxy-6,7-benzomorphan is added and stirring at 0° C. continued for three hours. The reaction mixture is then diluted with 200 ml. of ethyl ether and washed with 50 ml. of aqueous hydrochloric acid, 50 ml. of water, 50 ml. of 5% aqueous sodium bicarbonate and 50 ml. of water in that order. The organic solution is dried over anhydrous magnesium sulfate and filtered. The filtrate is concentrated to a 25 ml. volume to yield the appropriate 5,9-diethyl-2'-acyloxy-2-acyl-6,7-benzomorphan. The concentrate containing this benzomorphan intermediate is then added dropwise with stirring to a slurry of 0.5 gram of lithium aluminum hydride in 175 ml. of dry ethyl ether. The suspension is heated under reflux for 6 hours and the excess lithium aluminum hydride is decomposed by the dropwise addition of 2 ml. of water. The precipitate inorganic solutions are separated by filtration and thoroughly washed with dry ethyl ether. The combined filtrates are concentrated to dryness and the crystalline residue is dissolved in hot methanol and filtered. Upon cooling, 5,9-diethyl-2'-hydroxy-2 - (3-thietylmethyl)-6,7-benzomorphan precipitates from the solution and is filtered. Recrystallization from hot methanol yields essentially pure 5,9-diethyl-2'-hydroxy-2-(3-thietylmethyl)-6,7-benzomorphan.

Following substantially the same procedure as above but using an equivalent amount of 4-ethyltetrahydrothienyl-3-carboxylic acid in place of thietyl-3-carboxylic acid there is produced 5,9-diethyl-2'-hydroxy-2-[3-(4-ethyltetrahydrothienyl)methyl]-6,7-benzomorphan.

EXAMPLE 3

5,9-diethyl-2'-hydroxy-2-(N-methyl-3-azetidinylmethyl)-6,7-benzomorphan

A solution of .02 mole of N-methyl-azetidine-3-carboxylic acid in 75 ml. of dry chloroform is treated with .02 mole of isobutylchloroformate added dropwise with stirring at −5° C. The solution is stirred at −5° C. for 15 minutes and then .01 mole of 5,9-diethyl-2'-hydroxy-6,7-benzomorphan is added and stirring at −5° C. is continued for 4 hours. The reaction mixture is diluted with 200 ml. of ether and washed with 5% aqueous hydrochloric acid (75 ml.), water (75 ml.), 5% aqueous ammonia (75 ml.) and water (75 ml.). The organic layer is dried over magnesimu sulfate, filtered and evaporated under reduced pressure to yield the crude 5,9-diethyl-2'-acyloxy-2-acyl-6,7-benzomorphan. This residue is dissolved in dry ether (75 ml.) and added dropwise to a stirred slurry of 1.5 g. of lithium aluminde hydride in 150 ml. of dry ether. After stirring under reflux for 5 hours, 3 ml. of water added dropwise and the mixture is filtered. The filtrate is evaporated and the residue recrystallized from methanol to give 5,9-diethyl-2'-hydoxy-2-(N-methyl-3-azetidinylmethyl) - 6,7 - benzomorphan.

Following substantially the same procedure as described in Example 3 above but using an equivalent amount of N,4-dimethylpyrrolidinyl-3-carboxylic acid, N - cyclopropyl-2,6-dimethylpiperidinyl-4-carboxylic acid and tetrahydrofuryl-3-carboxylic acid in place of N-methyl-azetidine-3-carboxylic acid there is produced 5,9-diethyl-2'-hydroxy-2-[3-(N,4 - dimethylpyrrolidinyl)-methyl]-6,7 - benzomorphan, 5,9-diethyl-2'-hydroxy-2-[4-(N-cyclopropyl - 2,6 - dimethylpiperidinyl)methyl]-6,7-benzomorphan and 5,9-diethyl-2'-hydroxy-2-(3-tetrahydrofurylmethyl)-6,7-benzomorphan, respectively.

EXAMPLE 4

5,9-diethyl-2'-hydroxy-2-epoxypropyl-6,7-benzomorphan

A solution of 0.1 mole of 5,9-diethyl-2'-hydroxy-6,7-benzomorphan and 0.2 mole of epibromohydrin in ethanol containing 0.2 mole of sodium bicarbonate is refluxed for 5 hours.

The solution is then filtered and the filtrate evaporated to dryness under reduced pressure.

The residue is extracted with ether, filtered and the filtrate evaporated to dryness. The residue is crystallized from ethyl acetate to give 5,9-diethyl-2'-hydroxy-2-epoxypropyl-6,7-benzomorphan.

What is claimed is:

1. A compound consisting of a free base or its non-toxic acid addition salts, the free base having the formula:

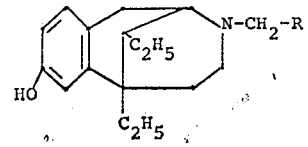

wherein R represents 3-thietyl, 2-epoxyethyl, N-methyl-3-azetidinyl, 3-(N,4-dimethylpyrrolidinyl), 3-tetrahydrofuryl, 3-(4-ethyltetrahydrothienyl) or 4-(N-cyclopropyl-2,6-dimethylpiperdinyl).

2. A dextrorotatory (+) optical isomer form of a compound of claim 1.

3. A levorotatory (−) optical isomer form of a compound of claim 1.

4. A compound of claim 1 wherein R is a 3-thietyl radical thus forming 5,9-diethyl-2'-hydroxy-2-(3-thietylmethyl)-6,7-benzomorphan.

5. A compound of claim 1 wherein R is epoxyethyl thus forming 5,9-diethyl-2'-hydroxy-2-epoxypropyl-6,7-benzomorphan.

6. A compound of claim 1 wherein R is N-methyl-3-azetidinyl thus forming 5,9-diethyl-2'-hydroxy-2-(N-methyl-3-azetidinylmethyl)-6,7-benzomorphan.

References Cited

UNITED STATES PATENTS

| | | | |
|---|---|---|---|
| 2,924,603 | 2/1960 | Gordon et al. | 260—293.4 |
| 1,790,042 | 1/1931 | Eisleb | 260—348 |
| 1,845,403 | 2/1932 | Eisleb | 260—348 |

JAMES A. PATTEN, Primary Examiner

U.S. Cl. X.R.

260—294.7, 294.3, 999; 424—267